US008688461B1

(12) United States Patent
Richards et al.

(10) Patent No.: US 8,688,461 B1
(45) Date of Patent: Apr. 1, 2014

(54) ELECTRONIC REGISTRY FOR AUTHENTICATING TRANSFERABLE RECORDS

(75) Inventors: John A. Richards, Silver Spring, MD (US); Pamela Holland, Chevy Chase, MD (US); J. Harvey Trimble, Great Falls, VA (US); Mark Oliphant, Easton, MD (US); Mark A. Timmick, Clarksville, MD (US)

(73) Assignee: Fannie Mae, Washington, DC (US)

( * ) Notice: Subject to any disclaimer, the term of this patent is extended or adjusted under 35 U.S.C. 154(b) by 2505 days.

(21) Appl. No.: 10/357,602

(22) Filed: Feb. 4, 2003

Related U.S. Application Data

(60) Provisional application No. 60/368,510, filed on Mar. 29, 2002.

(51) Int. Cl.
*G06Q 10/00* (2012.01)

(52) U.S. Cl.
USPC ............ 705/1.1; 713/150; 713/176; 713/155; 705/67; 705/51; 705/57; 705/76

(58) Field of Classification Search
USPC .............................................. 705/50–79, 1.1
See application file for complete search history.

(56) References Cited

U.S. PATENT DOCUMENTS

| | | | |
|---|---|---|---|
| 4,461,028 A * | 7/1984 | Okubo | 382/115 |
| 5,615,268 A | 3/1997 | Bisbee et al. | |
| 5,748,738 A | 5/1998 | Bisbee et al. | |
| 6,052,242 A * | 4/2000 | Hirata | 360/15 |
| 6,128,102 A * | 10/2000 | Ota | 358/403 |
| 6,189,009 B1 | 2/2001 | Stratigos et al. | |
| 6,209,095 B1 | 3/2001 | Anderson et al. | |
| 6,226,618 B1 * | 5/2001 | Downs et al. | 705/1 |
| 6,237,096 B1 * | 5/2001 | Bisbee et al. | 713/178 |
| 6,289,460 B1 | 9/2001 | Hajmiragha | |
| 6,338,050 B1 | 1/2002 | Conklin et al. | |
| 6,339,825 B2 * | 1/2002 | Pensak et al. | 713/158 |
| 6,367,013 B1 | 4/2002 | Bisbee et al. | |
| 6,385,596 B1 | 5/2002 | Wiser et al. | |
| 6,438,526 B1 | 8/2002 | Dykes et al. | |
| 6,438,560 B1 * | 8/2002 | Loen | 707/103 R |
| 6,452,614 B1 | 9/2002 | King et al. | |
| 6,456,981 B1 | 9/2002 | Dejaeger et al. | |

(Continued)

FOREIGN PATENT DOCUMENTS

| | | |
|---|---|---|
| JP | 2003256744 | 9/2003 |
| WO | WO0008541 | 2/2000 |

(Continued)

OTHER PUBLICATIONS

White, "How Computers Work", Millennium Edition, 1999, Que Corporation, Indianapolis, IN, all pages.*

(Continued)

*Primary Examiner* — Jacob C. Coppola
(74) *Attorney, Agent, or Firm* — Rader, Fishman & Grauer PLLC

(57) ABSTRACT

An electronic registry stores information relating to a transferable electronic record and the controller of an authoritative copy of the transferable electronic record. The electronic registry includes information for authenticating a true copy of the authoritative copy of the transferable electronic record. The electronic registry also facilitates registration of the transferable electronic record and transfer of legal rights associated therewith.

17 Claims, 10 Drawing Sheets

(56) References Cited

U.S. PATENT DOCUMENTS

| | | | |
|---|---|---|---|
| 6,594,633 B1 | 7/2003 | Broerman | |
| 6,600,823 B1* | 7/2003 | Hayosh | 380/51 |
| 6,609,200 B2 | 8/2003 | Anderson et al. | |
| 6,635,089 B1 | 10/2003 | Burkett et al. | |
| 6,751,632 B1 | 6/2004 | Petrogiannis | |
| 6,865,572 B2* | 3/2005 | Boguraev et al. | 1/1 |
| 6,993,655 B1* | 1/2006 | Hecht et al. | 713/176 |
| 7,010,580 B1* | 3/2006 | Fu et al. | 709/217 |
| 7,051,364 B1* | 5/2006 | Tackman et al. | 726/3 |
| 7,162,635 B2* | 1/2007 | Bisbee et al. | 713/176 |
| 7,660,981 B1* | 2/2010 | Hunt | 713/156 |
| 2001/0002485 A1* | 5/2001 | Bisbee et al. | 705/51 |
| 2001/0005829 A1 | 6/2001 | Raveis | |
| 2001/0018739 A1 | 8/2001 | Anderson et al. | |
| 2001/0029482 A1 | 10/2001 | Tealdi et al. | |
| 2001/0044764 A1 | 11/2001 | Arnold | |
| 2002/0010679 A1 | 1/2002 | Felsher | |
| 2002/0019838 A1 | 2/2002 | Petrogiannis | |
| 2002/0029194 A1 | 3/2002 | Lewis et al. | |
| 2002/0035578 A1 | 3/2002 | Stratigos et al. | |
| 2002/0049624 A1 | 4/2002 | Raveis | |
| 2002/0052814 A1 | 5/2002 | Ketterer | |
| 2002/0055946 A1* | 5/2002 | Prager et al. | 707/500 |
| 2002/0059137 A1 | 5/2002 | Freeman et al. | |
| 2002/0069358 A1 | 6/2002 | Silvester | |
| 2002/0073020 A1 | 6/2002 | McFarland et al. | |
| 2002/0078159 A1 | 6/2002 | Petrogiannis et al. | |
| 2002/0091651 A1* | 7/2002 | Petrogiannis et al. | 705/76 |
| 2002/0116321 A1 | 8/2002 | Arehart | |
| 2002/0116331 A1 | 8/2002 | Cataline et al. | |
| 2002/0116531 A1 | 8/2002 | Chu | |
| 2002/0128940 A1* | 9/2002 | Orrin et al. | 705/35 |
| 2002/0128969 A1 | 9/2002 | Parmelee et al. | |
| 2002/0129256 A1 | 9/2002 | Parmelee et al. | |
| 2002/0129257 A1 | 9/2002 | Parmelee et al. | |
| 2002/0138476 A1* | 9/2002 | Suwa et al. | 707/3 |
| 2002/0143711 A1 | 10/2002 | Nassiri | |
| 2002/0169702 A1 | 11/2002 | Eaton, Jr. et al. | |
| 2002/0178035 A1 | 11/2002 | Lajouanie | |
| 2003/0009418 A1 | 1/2003 | Green et al. | |
| 2003/0036994 A1 | 2/2003 | Witzig et al. | |
| 2003/0055783 A1 | 3/2003 | Cataline et al. | |
| 2003/0074297 A1 | 4/2003 | Carragher | |
| 2003/0093679 A1* | 5/2003 | Hawkins et al. | 713/181 |
| 2003/0110400 A1 | 6/2003 | Cartmell et al. | |
| 2003/0120588 A1 | 6/2003 | Dodd et al. | |
| 2003/0144948 A1 | 7/2003 | Cleary et al. | |
| 2003/0158811 A1 | 8/2003 | Sanders et al. | |
| 2003/0172296 A1 | 9/2003 | Gunter | |
| 2003/0172297 A1 | 9/2003 | Gunter | |
| 2003/0172298 A1 | 9/2003 | Gunter et al. | |
| 2003/0172299 A1 | 9/2003 | Gunter | |
| 2003/0177071 A1 | 9/2003 | Treese et al. | |
| 2003/0182151 A1 | 9/2003 | Taslitz | |
| 2003/0208557 A1 | 11/2003 | Higbee | |
| 2003/0225688 A1 | 12/2003 | Dobbins | |
| 2003/0233418 A1 | 12/2003 | Goldman | |
| 2004/0098663 A1* | 5/2004 | Rey et al. | 715/500 |
| 2004/0111619 A1* | 6/2004 | Laurie et al. | 705/75 |
| 2005/0091261 A1* | 4/2005 | Wu et al. | 707/102 |

FOREIGN PATENT DOCUMENTS

| | | |
|---|---|---|
| WO | WO0019296 | 4/2000 |
| WO | WO0019315 | 4/2000 |
| WO | WO0049521 | 8/2000 |
| WO | WO0062140 | 10/2000 |
| WO | WO0127832 | 4/2001 |
| WO | WO0201479 | 1/2002 |
| WO | WO0203174 | 1/2002 |
| WO | WO0203774 | 1/2002 |
| WO | WO0221383 | 3/2002 |
| WO | WO0237367 | 5/2002 |
| WO | WO0237386 | 5/2002 |
| WO | WO02063431 | 8/2002 |
| WO | WO02075575 | 9/2002 |
| WO | WO02075615 | 9/2002 |
| WO | WO02075616 | 9/2002 |
| WO | WO02075617 | 9/2002 |
| WO | WO02075618 | 9/2002 |
| WO | WO03077130 | 9/2003 |

OTHER PUBLICATIONS

Derfler, "How Networks Work", Bestseller Edition, 1996, Ziff-Davis Press, Emeryville, CA, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

"Smart Document Specification—RC6.6", Mortage Bankers Association of America, Inc., Sep. 19, 2002, pp. 1-87.

"Guidelines for Document Custodians", Fannie Mae, Sep. 9, 1999.

* cited by examiner

ELECTRONIC REGISTRY FOR AUTHENTICATING TRANSFERABLE RECORDS

CROSS-REFERENCE TO RELATED APPLICATIONS

This application claims priority under 35 U.S.C. §119(e) to U.S. Provisional Application No. 60/368,510, filed Mar. 29, 2002 and hereby incorporated by reference in its entirety.

BACKGROUND OF THE INVENTION

1. Field of the Invention

The invention relates to the field of handling transferable electronic records evidencing ownership of an asset, such as a transferable note, tangible asset, or intangible asset.

2. Description of the Related Art

Originating, handling, and servicing mortgages has been a paper intensive process. The collection, generation, movement, and authentication of paper documents among numerous unrelated parties has been critical to the mortgage process. Computers and telecommunications have been used to improve the mortgage process for both consumers and service providers and various systems have been developed for streamlining the application, evaluation, underwriting, and origination processes. Similarly, once a mortgage has been originated, electronic data networks have improved information sharing among parties in the secondary mortgage market. These data networks facilitate transactions and decrease processing times for mortgage servicers, mortgage owners, and creators of mortgage-backed securities. However, the legal requirement of a paper mortgage note and the importance of the note's content and control have limited the scope of automation possible. All parties to a mortgage transaction have relied on an executed mortgage note to effect enforceable creation, ownership, and transfer of the rights and responsibilities arising under property and debtor/creditor laws. The need to handle a unique paper document has been a limiting factor in using electronic systems to improve the efficiency of the mortgage process.

In July 1999, the National Conference of Commissioners on Uniform State laws gave final approval to the Uniform Electronic Transactions Act (UETA). UETA enables consumers, business, and government to agree to use electronic forms of records, signatures, acknowledgments and notarization. It requires no standard or particular form of electronic transaction. Instead, UETA validates the use of electronic means where traditional paper documents and signatures were previously required. The centerpiece of UETA is §7 which validates the use of electronic records and signatures. Electronic records satisfy requirements for writings so that the enforceability of a record or signature cannot be denied simply because it is in electronic form. An electronic record is a record created, generated, sent, communicated, received or stored by electronic means. An electronic signature is an electronic sound, symbol or process attached to or associated with a record and executed or adopted by a person with the intent to sign the record.

Section 16 (Transferable Records) of UETA creates the concept of "control" over a special type of electronic record, the transferable electronic record. "Control," once established, is the equivalent of "possession" traditionally used in the paper context. Systems must be in place to ensure that the transfer of the record is done in such a manner that there is only ever one "holder" of the record. To qualify for "control" under the Safe Harbor provisions of Section 16, the transferable record must be created, stored and assigned in such a manner that:

It remains unique, identifiable and unalterable.

The authoritative copy identifies the person asserting control as either the person to which the record was issued or most recently transferred The authoritative copy is communicated to and maintained by the person asserting control or its designated custodian Copies or revisions that add or change an identified assignee of the authoritative copy can be made only with the consent of the person asserting control Each copy of the authoritative copy and any copy of a copy is readily identifiable as a copy and not the authoritative copy Any revision is readily identifiable as an authorized or unauthorized revision.

Transferable records are legally enforceable memoranda embodying rights to underlying assets or responsibilities. In this context, "transferable" does not refer to the ability to transfer the electronic record between computer systems or storage locations (though such records may also be "transferable" in this sense), but the ability to affect a legal transfer of the rights embodied in the electronic record. Examples of transferable electronic records include electronic equivalents of negotiable instruments, such as promissory notes, warehouse receipts, bills of lading, and similar legal paper. Transferable electronic records may also be expanded to include transferable records such as mortgages, deeds, titles, and other documents associated with underlying assets or obligations, such as real estate, motor vehicles, boats, equipment, airplanes, copyrights, trademarks, patents, or other tangible or intangible property.

There are numerous possibilities for systems enabling the creation, storage, and transfer of electronic records in accordance with the UETA. For example, it may be possible to create an electronic equivalent of a paper document, where the electronic document itself provides all information necessary to validate its authenticity. However, such solutions have proven difficult to implement securely. Control and transfer of the unique electronic record may be difficult and the opportunity for forgery of both records and transfers may be challenging to detect.

SUMMARY OF THE INVENTION

The invention overcomes the limitations of existing systems and methods for handling transferable records, such as mortgage notes. A transferable electronic record is the electronic equivalent of a transferable legal instrument. A transferable electronic record has a single current controller who has legal authority over the transferable electronic record. The transferable electronic record gives the controller legal authority over an underlying asset described in the transferable electronic record. Any transferable electronic record will have a single authoritative copy that is stored in a location maintained by a custodian. The custodian is an agent of the controller that physically holds the authoritative copy. Any number of non-authoritative copies of the transferable electronic record may also exist. A non-authoritative copy is regarded as a true copy of the transferable electronic record if the electronic information contained in the non-authoritative copy is materially identical to the electronic information contained in the authoritative copy.

One embodiment of the invention includes an electronic registry for transferable electronic records and methods of using same. The electronic registry stores information for identifying the current controller and custodian of the authoritative copy and verifying whether a copy of the transferable electronic record is a true copy. Each copy of the transferable electronic record includes a copy disclaimer. For example, contract terms or industry practice may dictate that originators of such transferable electronic records include a copy disclaimer in the electronic information in the transferable electronic record. The copy disclaimer indicates that the authoritative copy of the transferable electronic record exists, thus indicating that the copy being viewed probably is not the authoritative copy. The copy disclaimer also facilitates determination of the current controller, such as by identifying the electronic registry. The electronic registry may be used to validate non-authoritative copies of the transferable electronic record as true copies or to identify the current controller of the authoritative copy. The copy disclaimer is part of the transferable electronic record such that verification of a true copy of the transferable electronic record will include verification of the copy disclaimer.

BRIEF DESCRIPTION OF THE DRAWINGS

These and other features of the invention's embodiments are more fully described below. Reference is made throughout the description to the accompanying drawings, in which.

DETAILED DESCRIPTION OF THE INVENTION

Figure 1:
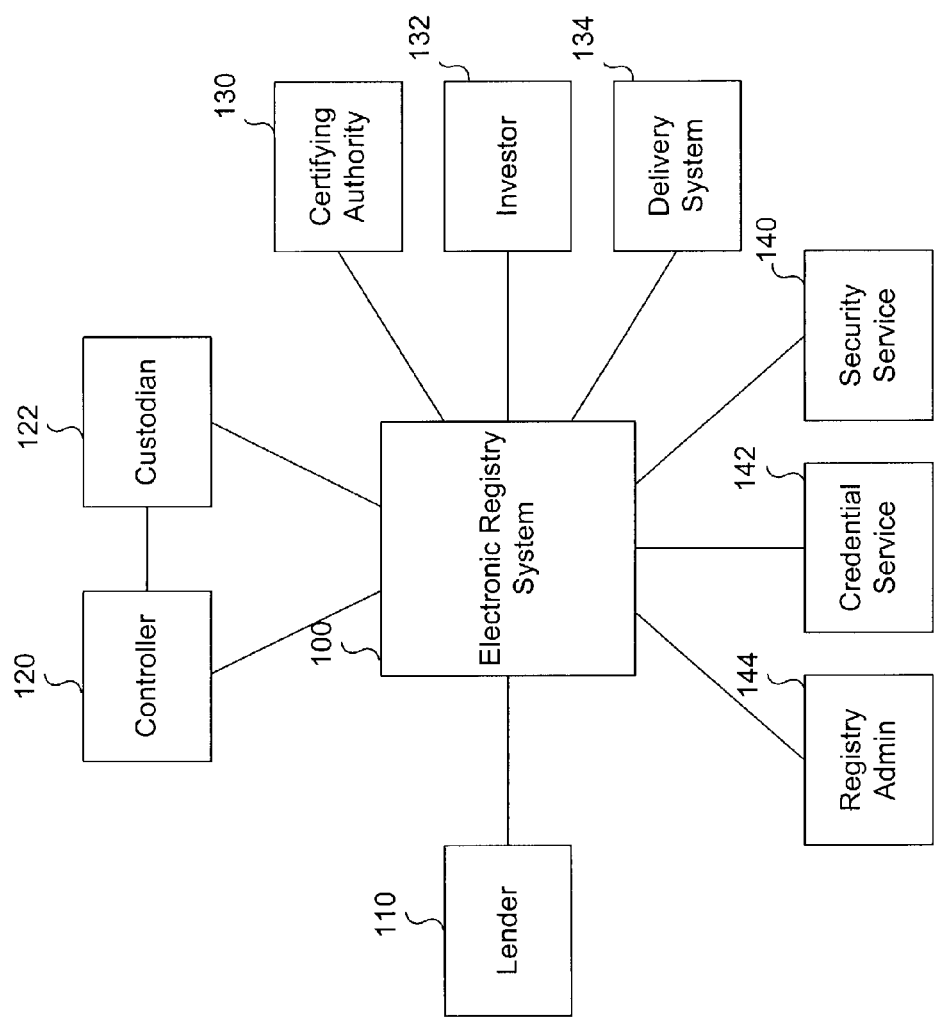
FIG. 1 is multi-party view of electronic registry users and service providers.

FIG. 1 shows a multi-party view of an electronic registry system 100. The electronic registry system 100 provides a centralized resource for storing information regarding transferable electronic records, such as controller and custodial information, authentication information, and descriptive information for identifying the electronic records. The electronic registry system 100 is embodied in a conventional computer system, including one or more microprocessors, memory systems, electronic storage devices, I/O devices, and software. For example, the electronic registry system 100 may be embodied in one or more server systems.

The logical operations of the electronic registry are implemented as a sequence of computer executed actions or program modules running on a computer system. The implementation is a matter of choice dependent on the performance requirements of the computing system implementing the electronic registry. The logical operations making up the electronic registry and associated systems, methods, and interfaces may be referred to variously as operations, structural devices, acts, steps, and modules. These operations, structural devices, acts, steps, and modules may be implemented in software, firmware, special purpose computing devices, user interface, and combinations thereof. In one embodiment, the electronic registry includes one or more software applications running on a general-purpose server platform.

The electronic registry system 100 is in communication with a plurality of systems involved in transactions with the transferable electronic records or backend operations of the electronic registry system 100. The electronic registry system 100 may integrate a plurality of disparate and heterogeneous systems. Each of these systems may be accessed or maintained by different parties. In the example environment shown in FIG. 1, the plurality of systems includes a lender system 110, a controller system 120, a custodian system 122, a certifying authority system 130, an investor system 132, a delivery system 134, a security service system 140, a credential service system 142, and a registry administrator system 144. Each of the systems is a computer system, subsystem, interface, software agent, thin client, or some combination thereof that interacts with the electronic registry system 100. These systems are connected to the electronic registry system 100 via one or more physical or electronic interfaces that provide communication with the resources of the electronic registry system 100. The different systems and parties may utilize different connections to the electronic registry. For example, some systems may share the computer resources of the electronic registry system 100 and communicate via APIs, method calls, common resources, or similar means. Other systems may access the electronic registry system 100 through an I/O device or user interface at the physical location of the computer system embodying the electronic registry. Still other systems may access the electronic registry system 100 across a network, such as a LAN or WAN, using network communication protocols and remote APIs, method calls, software agents, a thin client, or other means.

The lender system 110 is a system for originating transferable electronic records based upon a legal transaction that creates the transferable electronic record and attaches it to an underlying asset. In one embodiment, the lender system 110 is embodied in a software package that facilitates creation of an transferable electronic record, such as an electronic mortgage note. The user is generally an agent of a financial institution, such as a mortgage company. The software package is a local or Web-based application for originating a mortgage. For example, a mortgage agent may use a software package to gather information and documentation from the parties to a mortgage transaction, authorize the mortgage transaction, and create and execute an electronic mortgage. The lender system 110 is adapted to access to the electronic registry system 100 to register and deliver the newly originated transferable electronic record. For example, the lender system 110 may include a Web-browser by which the mortgage agent can access the electronic registry system 100 to register and deliver the transferable electronic record. In an alternate embodiment, the lender system 110 may provide an automated function for registering and delivering the transferable electronic record to the electronic registry system 100 based upon information collected in the origination process or other user or system preferences. The lender system may also include or communicate with one or more systems for application analysis and underwriting functions.

The controller system 120 and the custodian system 122 are the systems that presently control and store the authoritative copy of the transferable electronic record and the legal rights pertaining thereto. The controller system 120 is accessed by the controller—a financial institution or other party presently holding legal title to the transferable electronic record. The custodian system 122 maintains the authoritative copy of the transferable electronic record for the custodian. The custodian is an agent of the controller. Frequently, the entity that is controller will also be its own custodian. The controller system 120 and custodian system 122 provide controller information and custodian information to the electronic registry system 100. The electronic registry system 100 uses this information to electronically inform third parties as to the identity of the controller and the location of the authoritative copy. This information may be provided directly or by reference to another information source. The controller system 120 also allows the controller to view and update information regarding the transferable electronic record and to initiate transfer of the transferable electronic record to another party. For example, the controller system 120 and the custodian system 122 may include Web browsers that allow users to access controller or custodian interfaces to the electronic registry system 100.

The certifying authority system 130, the investor system 132, and the delivery system 134 are third party systems that are configured to access the electronic registry system 100. The certifying authority system 130 certifies compliance of the transferable electronic records and their underlying assets with a predetermined set of standards. For example, Fannie Mae Corp. provides a set of standards through its Desktop Underwriter™ software for certifying the creditworthiness of a given mortgage and its viability in the secondary mortgage market. The investor system 132 enables access to the electronic registry system 100 for entities investing in the transferable electronic records or securities derived therefrom. The investor system 132 provides information about a transferable electronic record or group of records, including controller information and custodian information. The investor system 132 may also authenticate copies of transferable electronic records through the electronic registry system 100. The delivery system 134 is an automated system for providing information to and receiving information from the electronic registry system 100. For example, the delivery system 134 may be part of a system used by a financial institution to automatically support its registration and transfer functions.

The security service system 40, the credential service system 142, and the registry administration system 144 support the backend functions of the electronic registry system 100. The security service 140 may provide digital certificates, encryption keys, encryption algorithms, user authentication, document fingerprinting technology, or other security related services. The electronic registry system 100 uses such services for user authentication, secure communications, and copy authentication. While some or all of these services may be provided internally within the electronic registry system 100, there may be advantages to having some of these services provided through an external provider over a secure network. The credential service 142 provides user identification and credentialing to ensure that only authorized entities or institutions with defined needs for the registry information have access to the electronic registry system 100. For example, the credential service 142 may include a database of accredited financial institutions, investors, and agents and provide and allow the electronic registry system 100 to verify a user's qualifications for access to selected information and functions. The registry administration 144 represents the access for the application, user, and data maintenance and support required to run a complex multi-party computer system.

Because a party and its systems may play multiple roles in interacting with the electronic registry system 100, the electronic registry system 100 may provide a single interface supporting multiple user roles and through which lender, controller, custodian, third party, and other functions may be completed. For example, the electronic registry system 100 may include one or more Web interfaces used by a variety of user types. The privileges and capabilities of a particular party may vary among transferable electronic records. A single party may be the originator and controller of one record, the custodian of another record, and an investor or certifying authority with regard to another record. The availability of functions is limited to the relationship the party accessing the electronic registry system 100 has with the specific transferable electronic record in issue. In some embodiments, the electronic registry system 100 provides specialized interfaces for specific roles. This is especially common for administrative functions and other relationships that do not tend to have much institutional or user crossover.

Figure 2:
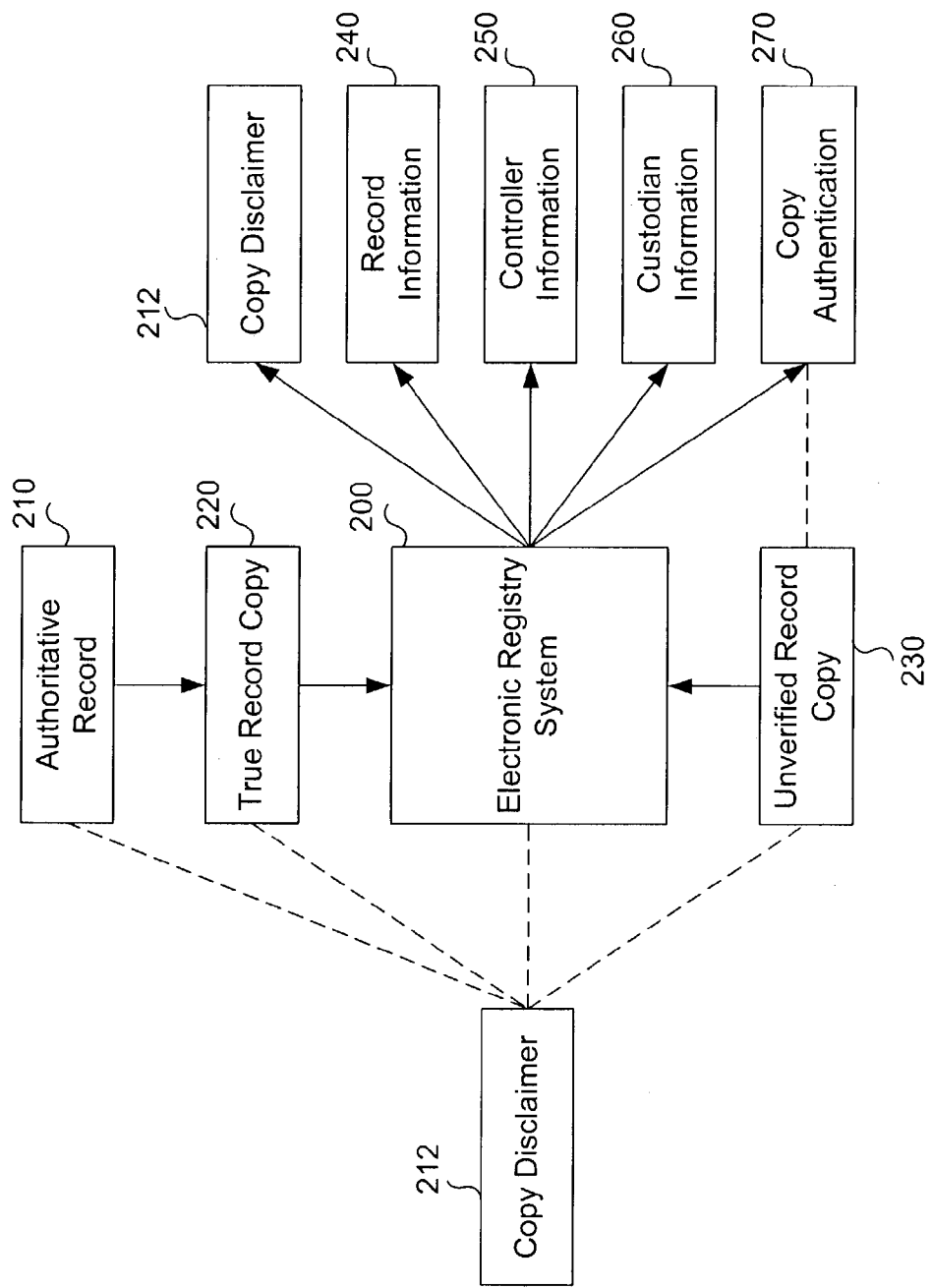
FIG. 2 is a functional overview of an electronic registry system.

FIG. 2 shows a functional overview of an example electronic registry system 200. The electronic registry system 200 stores information regarding a plurality of transferable electronic records. The information is used to provide definitive information on the identity of the controller and physical location of the authoritative copy of the transferable electronic record. The information is also used to support functions for registering, transferring, viewing, tracking, and disposing of the transferable electronic record.

The system presupposes the existence of an authoritative copy 210 of a transferable record. The single authoritative copy 210 supports compliance with Section 16 of UETA. The transferable electronic record includes all of the information typically associated with the equivalent paper document. For example, the transferable electronic record may include a description of the underlying asset, a date of execution, and identification of the originating parties. An electronic mortgage note might include a lender loan number, a property address, a borrower name, a data of execution, an original loan amount, an original percentage rate, a first payment due date, and a principal and interest amount.

The transferable electronic record also includes a digital signature affixed to the record at the time of execution. The digital signature is part of the authoritative copy 210. A digital signature uses digital certificates to signify legal intent. In one embodiment, the digital signature provides both a secure identification function for the signing entity and encryption for securing the content of the signed record. For example, the digital signature may use PKI and digital certificates to authenticate a specific user and encrypt the message digest of the transferable electronic record being signed. In alternate embodiments, other forms of electronic signature and encryption may be used. In alternate embodiments, the digital signature is used solely for document integrity and does not signify legal intent.

In one embodiment, the authoritative copy 210 of the transferable electronic record is an XML document based upon a predefined structure and tag set described in a Document Type Definition (DTD). Some example tags for an electronic mortgage DTD include: <MORTGAGE_TERMS>, <PROPERTY>, <BORROWER>, <LENDER>, <EXECUTION>, and <Signature>. Other markup languages or data formats may readily be used or adapted to embody a transferable electronic record.

The authoritative copy 210 and all other copies of the transferable electronic record include a copy disclaimer 212. The copy disclaimer 212 is intended to provide notice to anyone viewing a copy of the transferable electronic record. The copy disclaimer includes text stating that a single authoritative copy exists and identifies information for determining the controller of the single authoritative copy. An example copy disclaimer for use within the electronic registry system 200 is "The Single Authoritative Copy is stored in a secure system at a location within the custody and control of the controller identified above (or its designated custodian) which controller (or designated custodian) maintains for storage of the controller's Single Authoritative Copies." This copy disclaimer text is displayed in conjunction with controller information retrieved from the electronic registry system 200. It is implicit in providing identifying information for the controller that any copy being viewed or held by one other than the controller is not the authoritative copy. In an alternate embodiment of the copy disclaimer 212 for display outside of the electronic registry system 200, the copy disclaimer identifies the electronic registry system 200 as the means for locating the controller and location of the authoritative copy 210. The copy disclaimer 212 may include information for directing the user to the controller explicitly by identity and contact information or by reference to the electronic registry system 200. The copy disclaimer 212 may include information for directing the user to the custodian explicitly by identity and contact information or by reference to the controller or the electronic registry system 200. In one embodiment, the copy disclaimer 212 is stored and tagged as part of the authoritative copy 210 of the transferable electronic record. In one embodiment, the authoritative copy of the transferable electronic record includes multiple copy disclaimers for display depending on whether it is being viewed within the electronic registry system 200 or outside the electronic registry system 200. The copy disclaimer 212 is present in all copies of the transferable electronic record, including the authoritative copy 210, true record copies, and unverified record copies. The copy disclaimer 212 is displayed to the user as one of the functions of the electronic registry system 200.

A true record copy 220 is used to communicate information regarding the authoritative copy 210 of the transferable electronic record to the electronic registry system 200. The true record copy 220 includes identical data to the authoritative copy 210, including digital signature or other authentication information for the transferable electronic record. A true record copy 220 is provided at the time of registration with the electronic registry system 200. At registration, data from the true record copy 220 is abstracted and stored within the electronic registry system 200. That data may, in turn, be used to authenticate unverified record copies 230 and ascertain whether they too are true copies. The authoritative copy 210 itself remains in the possession of the controller and is not generally transferred to the electronic registry system 200.

The electronic registry system 200 stores copy disclaimer 212, record information 240, controller information 250, custodian information 260, and copy authentication information 270. Example data stored by the electronic registry system 200 is described below with regard to FIG. 4. This data forms the basis for various functions performed by the electronic registry system 200. This data is derived from the true record copy 220 and operations within the electronic registry system 200. Users of the electronic registry system can view information stored in the electronic registry system 200 regarding a selected transferable electronic record. For example, record information 240 describing the transferable electronic record and its underlying asset may be viewed alongside controller information 250 and custodian information 260. The copy authentication information 270 allows the electronic registry system to provide for tamper proofing and insure the record cannot be altered. It also provides non-repudiation to provide proof that the record was signed by a particular entity at a particular time and date. The electronic registry system 200 may also use field validation (to check that information in the record complies with the content category rules), logging (to record actions that have been performed on the record and identify the actor), access control (to prevent unauthorized users from accessing the record), and self-sufficiency (to provide a complete system that does not rely on external software which could compromise security and integrity concerns). Additional details for implementing an electronic registry system are provided below with regard to FIGS. 3 and 4.

Figure 3:
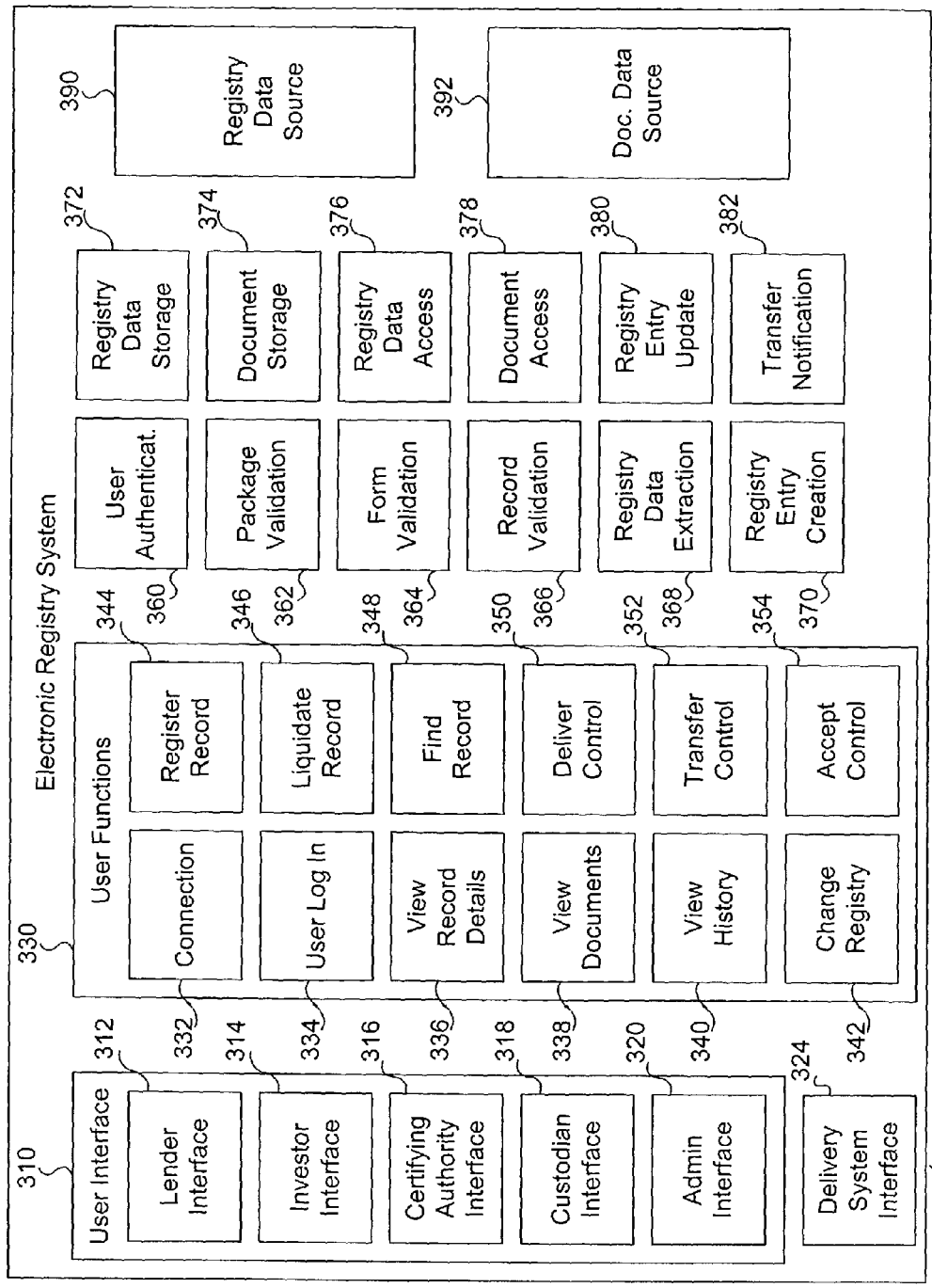
FIG. 3 is modular view of an example electronic registry system.

FIG. 3 shows the functional modules of an example electronic registry system 300. The electronic registry system 300 includes a plurality of interface modules, a plurality of user function modules, a plurality of backend function modules, and two data sources. The plurality of interface modules includes a user interface module 310 and a delivery system interface 324. The user interface module 310 includes several sub-modules, including a lender interface module 312, an investor interface module 314, a certifying authority module 316, a custodian interface module 318, and an administration interface 320. The user functions are grouped in a user function module 330. The user function modules include a connection module 332, a user login module 334, a view record details module 336, a view documents module 338, a view history module 340, a change registry module 342, a register record module 344, a liquidate record module 346, a find record module 348, a deliver control module 350, a transfer control module 352, and an accept control module 354. The backend function modules include a user authentication module 360, a package validation module 362, a form validation module 364, a record validation module 366, a registry data extraction module 368, a registry entry creation module 370, a registry data storage module 372, a document storage module 374, a registry data access module 376, a document access module 378, a registry entry update module 380, and a transfer notification module 382. The data sources include a registry data source 390 and a document data source 392. In one embodiment, these modules interrelate to form a single software application utilizing common computing resources.

The interface modules provide an interface for accessing the functions and data of the electronic registry system 300. The user interface module 310 provides a plurality of graphical user interfaces for accessing functions within the user function module 330. The user interface module 310 defines input and display forms for soliciting user input and providing data and options in response to user choices. In one embodiment, the user interface module 310 is embodied in a Web-based interface composed of dynamically generated HTML pages. Alternate embodiments include hard-coded application interfaces. An example interface structure based upon functionally oriented interface modules is described below with regard to FIG. 5. The electronic registry system 300 defines a plurality of user/activity specific user interfaces. Each of these interfaces may share some of its interface components with other user interfaces, but be optimized for specific user and function sets. For example, the lender interface module 312 provides an interface optimized for lenders. Registering, delivering, and locating and viewing loans within the lender's portfolio are the featured functions. The investor interface module 314 may lack registering and delivering functions. Transfer, acceptance, disposal, and locating and viewing loans within the investor's portfolio are the featured functions. The certifying authority interface 316 may not allow any of the controller functions and be geared solely for locating, viewing, and adding certification information to the registry information. The custodian interface module 318 may only allow the user to view loans within current custody, update custodial information, and transfer custody back to the controller. The administrative interface module 320 could include reporting, security, and data management functions that are entirely different than the functional options provided to normal users. Such reporting, security, and data management functions are well known in managing multi-user database-driven applications. The delivery system interface 324 provides an API for accessing data and functions without a graphical user interface.

The user functions 330 provide a number of functional tasks that a user may wish to complete using the electronic registry system. The user functions 330 process requests received through the user interfaces 310 or delivery system interface 324. The user functions 330 rely upon one or more backend functions to process the user requests and provide responsive data and program flow through the interface modules. The user functions may also utilize data from the registry data source 390 and document data source 392.

The connection module 332 initiates a connection between a remote system, such as a lender or investor terminal, and the electronic registry system 300. The connection module 332 includes communication and security protocols for establishing a secure channel for further communications between the remote system and the electronic registry system 300. For example, the connection module 332 may allow a user to establish an encrypted connection through a proprietary network or virtual private network.

The user login module 334 authenticates a user to the electronic registry system 300. User authentication is important to the security of the electronic registry system 300. While a user name and password may provide the basis for login to some systems, the use of more secure digital certificates is a preferred alternative. The user logs into the electronic registry system 300 by submitting a digital certificate when prompted. The digital certificate is authenticated by the user authentication module 360. The user authentication module 360 receives the digital certificate or selected information therefrom. In one embodiment, the user authentication module includes a file for verifying the existence and status of the received digital certificate. The file is periodically refreshed based upon information from a certificate issuing authority. If the digital certificate is valid and has not been revoked the user will be verified based upon user information, such as an e-mail address or IP address associated with the user. If the user information is valid, the policy ID from the digital certificate will be verified against current digital certificates stored by the electronic registry system 300. In the event that any of the validations are not successful, the login will fail and an appropriate error message will be provided. Otherwise, the user will be directed to an appropriate user interface for accessing additional functions of the electronic registry system 300.

The view record details module 336 allows a user to select and view the details of a desired transferable electronic record. In one embodiment, the complete details for a transferable electronic record are provided in a single interface. The details include information stored in the registry entry for the transferable electronic record. The details include information extracted from the transferable electronic record, registry generated information, related information submitted by prior users, and/or information from or regarding related documents. For example, the details provided for electronic mortgage record may include: a registry identification number, a lender loan identification number, a MERS MIN number, a data registered, a status, a property address, a borrower name, a delivery execution, a pool number, a loan term, an original loan amount, an original loan rate, a first payment due date, an amortization type, a loan type, and authentication information. The view record details module 336 will also display controller and/or custodian information and an appropriate copy disclaimer. In one embodiment, the user is allowed to modify selected fields in the display based upon the user's type and relationship to the transferable electronic record. If the user is authorized to modify the information and changes are made and submitted, the registry entry update module 380 will make appropriate modifications to the registry entry in the registry data source.

The view documents module 338 allows the user to view documents that have been uploaded to the electronic registry system. The documents are stored in the document data source and associated with the related registry entry in the registry data source. Associated documents are generally uploaded at the same time as the transferable electronic record and are stored within the electronic registry system with a reference to the transferable electronic record to which they relate. The view documents module 338 provides a list of documents associated with a selected transferable electronic record. The user will be allowed to select one or more documents from the list to view. In addition to links to the documents themselves, the registry entry may include document authentication information for each of the documents. Like the transferable electronic record itself, each of the documents may include a digital signature allowing authentication of the identity of the signature on the document and the integrity of the document based upon a hash value. The view documents module may use the document access module 378 to retrieve and format the stored documents for display. The document access module 378 may also verify that the documents have not been tampered with based upon the stored document authentication information. If the documents have been tampered with, an appropriate error message will be generated. In one embodiment, the documents will be displayed in an appropriate format, such as HTML or PDF, in a separate window or portion of the interface. The available documents may or may not include access to a copy of the transferable electronic record, depending on whether the registry maintains a true copy of the transferable electronic record or not.

The view history module 340 allows the user to access a log of all transfers in control or custody that have occurred to a selected transferable electronic record from the time of registration until the transferable electronic record is disposed of (e.g., papered out, transferred between registries, or liquidated). Each transfer of controller or status change for a transferable electronic record is logged in the registry entry for that transferable electronic record. The view history module 340 will use the registry data access module 376 to query the registry data source and return the transfer history of the selected transferable electronic record. The data retrieved will include the date and time of the transfer, the user initiating the status change or transfer, and the nature of the status change or transfer. The data retrieved may also include a comment field that is provided by the user initiating the transfer or change of status. In one embodiment, the history of a transferable electronic record is available to any entity in the chain of controllers.

The change registry module 342 allows the user to transfer the transferable electronic record from the electronic registry system 300 to another registry system. The user names another registry as the system of record for tracking ownership control of the transferable electronic record. The user selects a transferable electronic record under his or her control to transfer. The user then specifies the name, controlling organization, and contact information for the new registry. The user then initiates the transfer. The change registry module 342 uses the registry entry update module 380 to update the status of the transferable electronic record to "Transferred." Note that this operation may only be performed on a transferable electronic record with "Active" status. The change registry module 342 may also provide confirmation of the change in status. Note that the change registry module 342 does not need to actually transfer the transferable electronic record or in any way communicate with the new registry. The change registry module 342 merely updates the status within the present registry in order to inform users that it is no longer responsible for current information on the record and to provide information for locating the new registry. It is left to the controller and/or custodian to actually transfer information to the new electronic registry based upon that system's origination policies. In an alternate embodiment, the change registry module 342 may also assist in communicating information regarding the transferable electronic record to the new registry.

The register record module 344 allows a user to register a new transferable electronic record with the electronic registry system 300. The user initiates registration of a new loan and is prompted for the upload of a true copy of the transferable electronic record to be registered. In one embodiment, the transferable electronic record is uploaded as part of a package containing one or more documents related to the transferable electronic record. Once the package is received, the register record module relies upon several backend functions to perform authentications on the received package and its contents.

The package validation module 362 validates the general structure and contents of the package. The package validation module 362 verifies that the package complies with a predetermined package structure. The package validation module 362 verifies that the package was digitally signed by the originating entity. The package validation module 362 verifies that the package has not been tampered based upon the hash value associated with its digital signature. The documents contained in the package are checked to insure that one and only one transferable electronic record (actual note) is present in the package and that the transferable electronic record is signed. If any of the verifications fail, an appropriate error message is generated.

For each document in the package, additional form validation is executed by the form validation module 364. Each document is validated against a predefined document format for various document components. The verified components include the digital signature, header section and name, and document authentication information. The form validation module 364 also verifies that each document has not been tampered with based upon the hash value associated with the digital signature. If any of the verifications fail, an appropriate error message is generated.

Additional verification is performed on the actual transferable electronic record by the record validation module 366. One or more field values within the transferable electronic record are compared against comparable values within the registry data source 390 to insure that the transferable electronic record has not previously been registered. The presence of all required authentication information (e.g., digital certificate, hash algorithm, date and timestamp, name of digital signer, and signature value) will also be verified by the record validation module 366. The record validation module 366 will also validate header information from the document, such as name and state. The record validation module 366 will verify that the document has not been tampered with by re-running the hashing algorithm and comparing the resulting value against the hash value received with the document. If any of the verifications fail, an appropriate error message will be generated.

If all of the authentications run successfully, the register record module 344 will prompt the user for additional information. The register record module will display a summary of record information extracted from the transferable electronic record. The registry data extraction module 368 is responsible for extracting the desired information from the transferable electronic record for use by the register record module. Extracted information includes descriptive information from the record. The data from an electronic mortgage might include: the property address, borrower name, loan date, loan amount, and other information on the face of the electronic mortgage. The user may also be allowed to enter data not provided by the transferable electronic record, such as lender loan identifier. The register record module will also provide the initial controller of the transferable electronic record, which in most cases is the entity registering the transferable electronic record. When the controller information is displayed, an appropriate copy disclaimer will also be displayed. The register record module may also provide a final summary of any updated information for acceptance by the user.

Once the final acceptance is received, the register record module 344 will initiate creation of appropriate registry and document entries within the registry data source 390 and document data source 392. The register record module 344 uses the registry entry creation module 370 to create a registry entry. Creation of a registry entry generates registry information, such as registry ID number and a time and date of creation. The register record module 344 then uses the registry data storage module 372 to populate the registry entry with the record information extracted from the transferable electronic record and/or input by the user. The document storage module 374 is used by the register record module 344 to store any document received in the package that the electronic registry system is set to retain. Note that this may or may not include storing the true copy of the transferable electronic record received. The document storage module 374 also insures that both links and authentication information for each stored document is associated with the registry entry. Once data is stored in the registry data source 390 and the document data source 392, the transferable electronic record is officially registered and an appropriate confirmation is generated for the user.

The liquidate record module 346 allows the liquidation of a transferable electronic record stored within the electronic registry system 300. Liquidation of a transferable electronic record typically occurs when the transferable electronic record no longer needs to be maintained by the electronic registry system 300. Liquidation may also be referred to as deactivation of the transferable electronic record. The most common reason for liquidation is fulfillment of the obligation underlying the transferable electronic record, such as paying off the loan secured by the note. Liquidating a transferable electronic record involves marking the registry entry corresponding to that record as liquidated. The user selects a loan to liquidate, is provided with an appropriate explanation of the results of liquidation, and executes the liquidation. The liquidate record module 346 validates that the user identification corresponds with the controller of the transferable electronic record prior to executing the liquidation. The liquidate record module 346 uses the registry update module 380 to change the status of the loan to liquidated. User information and time and date stamp are also recorded within the registry entry for use in providing transaction histories and an audit trail. The ability to access the liquidate record module 346 is limited to the current controller of the transferable electronic record and is generally provided through lender interface module 312 and the investor interface module 314. Liquidated loans may remain accessible to prior controllers. In one embodiment, the electronic registry system 300 also allows un-liquidation or reactivation of a previously liquidated loan by the last controller of that loan. The electronic registry system 300 may allow a user other than the last controller to un-liquidate a loan according to a process similar to that user for registration and transfer of a loan, including all appropriate validations. An alternate form of removing a transferable electronic record from active status similar to liquidation is papering out. Papering out involves conversion of the transferable electronic record into a traditional paper equivalent. The electronic registry system 300 may also include a separate module (not shown) for assisting a user in completing additional steps relating to papering out a loan, such as generation of the actual paper note.

The find record module 348 enables the identification of one or more registry entries corresponding to one or more desired transferable electronic records. The find record module 348 includes a search engine or function that can locate a registry entry based upon selected fields in the registry entries. For example, in a mortgage registry, selected fields might include registry identifier, lender loan identifier, loan status, property address, borrower name, date registered, date delivered, and rejected status. The search engine may include any combination of conventional features, such as complex search criteria, Boolean or natural language searching, searchable ranges, result sorting, result filtering, etc. The find record module 348 uses the registry data access module 376 to access registry data and evaluate it against the search criteria. In one embodiment, the find record module 348 includes a default search that retrieves and displays all transferable electronic records controlled by the user whenever the user accesses the system.

The deliver control module 350 enables the delivery of control of a transferable electronic record from the party registering the transferable electronic record to a first controller. For example, the deliver control module 350 would allow the lender originating and registering an electronic mortgage to deliver that electronic mortgage to an investor. The deliver control module 350 allows a user to specify the destination controller for the delivery. The destination controller may be selected from a menu of available investors or by inputting identifying information, such as a seller/servicer number issued by an appropriate credentialing service.

The deliver control module 350 then verifies the user's authority to transfer control. In one embodiment, the deliver control module 350 undergoes a validation that parallels the validation involved in recording a transferable electronic record using the register record module 344. The deliver control module 350 requests the user to upload a package including a true copy of the transferable electronic record. The package is validated by the package validation module 362. The form of the documents within the package are validated by the form validation module 364. The transferable electronic record is validated by the record validation module 366. Each level of validation is performed against the authentication information stored within the registry data source 390 for the selected transferable electronic record.

If the validations are successful, the deliver control module 350 will provide a summary of the registry information for the transferable electronic record, including the appropriate copy disclaimer. The deliver control module 350 also provides a summary of the documents included in the package and allows the user to identify which documents are to be delivered to the destination controller. The deliver control module 350 may also prompt the user for additional information required for the delivery transaction. For example, in an electronic mortgage delivery, the user may have to input an execution type, pool number, loan type, amortization type, and loan term for evaluation by the destination controller. The user will also be requested to provide final confirmation to execute the transfer. The final confirmation may include an appropriate notice as to the effect of the transfer. Once the transfer is executed by the user, tentative control of the transferable electronic record is recorded in the registry as the destination controller. Status of the loan is updated to reflect the delivery. The transferable electronic record and its associated information in the registry data source 390 are now made available to the destination controller for review. Each of these updates to the registry data is made using the registry entry update module 380. The delivering user's access rights, based upon the record status, will be adjusted to prevent further modification of the registry entry, though they may still have access to some information and functions with regard to the delivered transferable electronic record. The deliver control module 352 may access the transfer notification module 382 to provide notification of the attempted transfer to the investor receiving control. The electronic registry system 300 may allow the investor receiving control of the transferable electronic record to accept or reject the transfer. If the delivery is rejected, the control reverts to the entity registering the transferable electronic record. The deliver control module 350 may also allow the controller of a rejected transferable electronic record to attempt re-delivery according to a process similar to the original delivery.

The transfer control module 352 operates similarly to the deliver control module 350. The present controller uploads a package including a true copy of the transferable electronic record. The package and true copy are authenticated. The information in the registry entry is updated to reflect the change in control.

The accept control module 354 allows the review and acceptance or rejection of control over a transferable electronic record. The receiving controller will receive notification of the transferable electronic record being transferred. The receiving controller will then be able to access registry information regarding the transferable electronic record and any documents transferred with the transferable electronic record. The receiving controller has the options of accepting (or certifying) the received transferable electronic record or rejecting it. In one embodiment, the receiving controller is provided with an interface for making comparisons between the registry data regarding the transferable electronic record and the true copy of the transferable electronic record. The user interface 310 may include several options for making the comparison (such as side-by-side windows, generation of hardcopy, etc.). The accept control module 354 may include several automated verifications as well. For example, the accept control module 354 may use the form validation module 364 and record validation module 366 to validate that the true copy has been digitally signed and has not been tampered with. Once the transferable electronic record is certified, the accept control module 354 will access the registry entry update module 380 to update the status and transaction history to reflect the certification. If a validation fails or the receiving controller decides to reject the transferable electronic record, the status and transaction history will be appropriately updated, control of the transferable electronic record will revert back to the transferor, and an appropriate message to notify the transferor will be generated (through the transfer notification module). In one embodiment, the receiving controller may have the option to un-certify and/or reject a previously accepted transferable electronic record. This feature may be disabled after a prescribed duration (e.g., 30 days).

The registry data source 390 and the document data source 392 store data in support of the various functions of the electronic registry system 300. The registry data source 390 is a database containing the registry information. The document data source 392 is a document repository for the true copy and supporting documents received in uploaded packages for the transferable electronic records. Note that the document data source 392 may provide only temporary storage of the true copy and supporting documents for registration, transfer, and acceptance purposes. It need not retain the documents to perform most functions of the electronic registry system 300.

Figure 4:
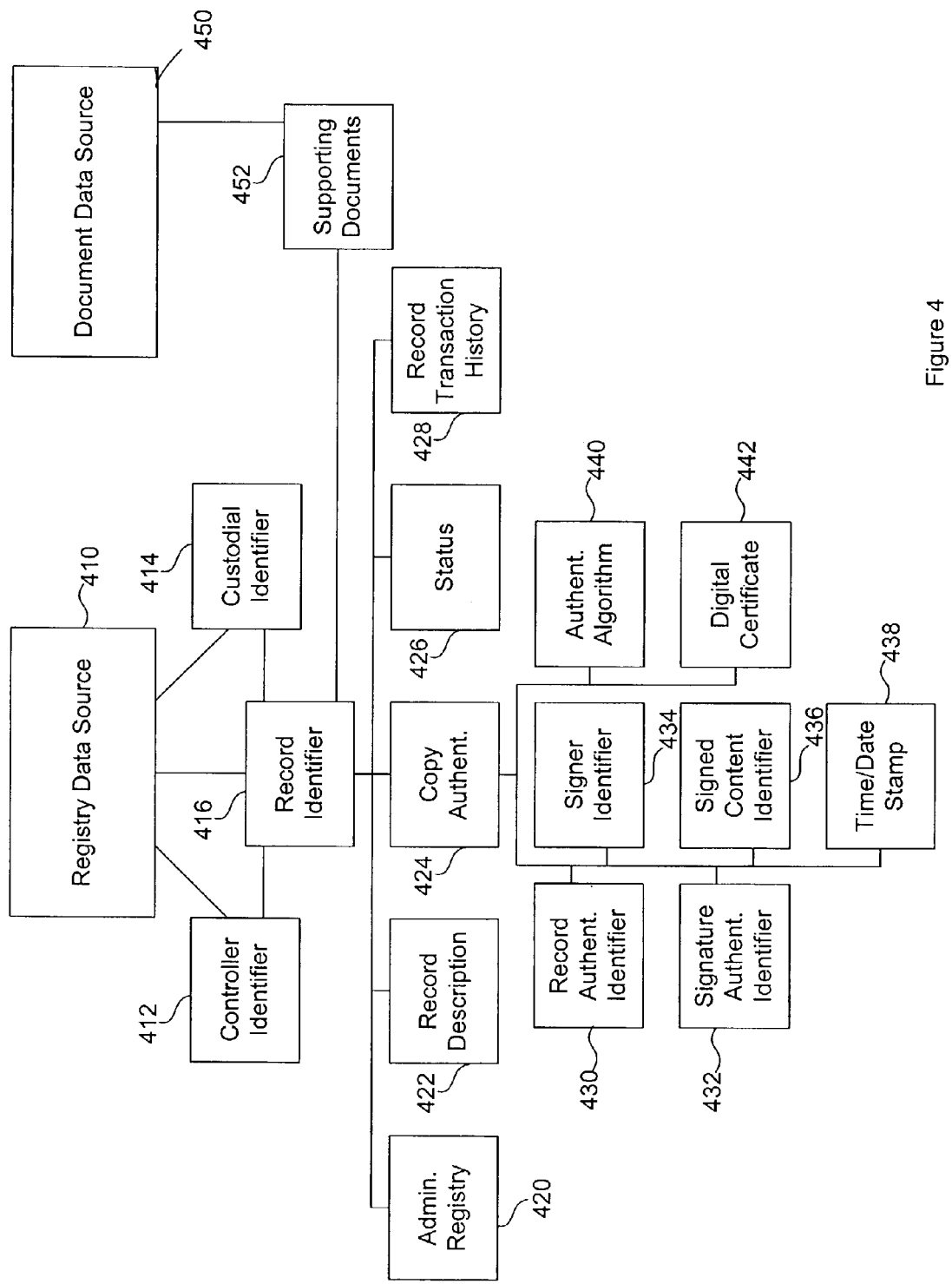
FIG. 4 is an example data model for an electronic registry system.

FIG. 4 shows an example data model for organizing registry information within a registry data source 410. The data model includes controller identifier data 412, custodial identifier data 414, and record identifier data 416. The controller identifier data 412 and custodial identifier data 414 includes data describing qualified entities that control or have custody of transferable electronic records handled by the electronic registry system. For example, each entity might have a key identifier, seller/servicer number, entity name, entity contact information, and one or more associated user names and certificates. The record identifier data 416 includes a key identifier for each of the transferable electronic records handled by the system. The key identifier for each transferable electronic record is used to access and handle the unique data associated with each record. The key identifiers may be based upon pre-existing identification information or may be assigned by the electronic registry system. Each record identifier is associated with a controller identifier and, optionally, a custodial identifier to provide controller and custodian information for each transferable electronic record. In one embodiment, the controller identifier data 412, the custodial identifier data 414, and the record identifier data 416 are stored in a relational database. Each includes at least one key data table including their respective key identifiers. One or more relationship tables may be used to define the relationships between the record identifiers and entries for their controllers or custodians.

The record identifier data 416 is associated with a variety of registry data relevant to each of the transferable electronic records. This associated registry data includes administrative registry data 420, record description data 422, copy authentication data 424, status data 426, and record transaction history data 428. The administrative registry data 420 includes data generated by the electronic registry system to track and handle data associated with the transferable electronic record, such as data keys, relationship data, access and change history data, and similar administrative data. The record description data 422 includes a combination of data extracted from the true copy of the transferable electronic record and supplemental information provided by the user regarding the transferable electronic record. The copy authentication information 424 includes security and certificate information for providing authentication and validation of received and registry data. Some example copy authentication information includes: a record authentication identifier 430, a signature authentication identifier 432, a signer identifier 434, a signed content identifier 436, a time/data stamp 438, an authentication algorithm 440, and a digital certificate 442. The status data 426 includes status information regarding the transferable electronic record and may include associations with specific entities (controller, transferor, transferee, custodian, etc.) and/or transactions. The record transaction history data 428 includes a log of transactions (register, transfer, certify, reject, access, etc.) associated with each transferable electronic record.

FIG. 4 also shows a document data storage 250 and the supporting documents 252 stored therein. The supporting documents 252 are associated with the record identifier data 216 for each transferable electronic record. In one embodiment, a catalog and links to the supporting documents 252 is associated with each record identifier and stored in the registry data source 410.

Figure 5:
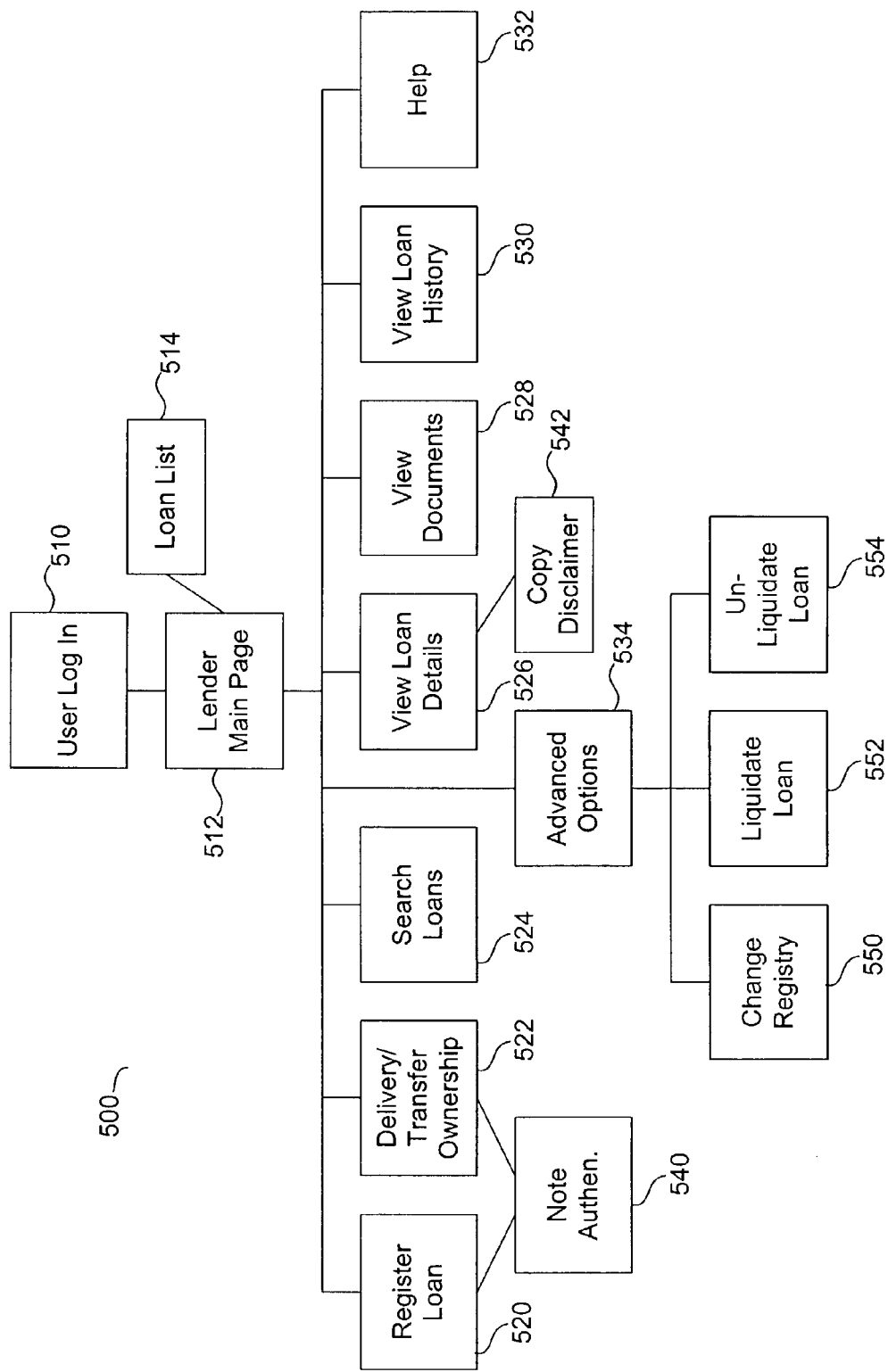
FIG. 5 is an example user interface map for an electronic registry system.

FIG. 5 shows an example interface hierarchy 500 for a user interface for an electronic registry system. The example hierarchy 500 shows a lender interface for an electronic mortgage registry. In one embodiment, the hierarchy 500 represents a map of linked functional interfaces. For example, the hierarchy 500 may include a plurality of hypertext linked HTML documents (static or dynamically generated). Each of the HTML documents may include information for display, forms for receiving user input, and links for initiating functions and/or navigating to additional documents.

The hierarchy 500 includes a user login interface 510 and a lender main page 512. The user login 510 provides an interface for connecting to and authenticating a user of the electronic mortgage registry. The lender main page 512 provides a starting point for lender activities and includes a loan list display 514 displaying the electronic mortgages in the electronic mortgage registry associated with the using lender. The lender main page 512 also includes links for accessing other lender oriented functions supported by the electronic mortgage registry.

The lender main page 512 connects to functional interfaces including: a register loans interface 520, a delivery/transfer ownership interface 522, a search loans interface 524, a view loan details interface 526, a view documents interface 528, a view loan history interface 530, a help interface 532, and an advanced options interface 534. The register loans interface 520 and the delivery/transfer ownership interface 522 include a note authentication interface 540, whereby a user may submit a package including a copy of an electronic mortgage note for authentication. The view loan details interface 526 provides loan details and controller information and incorporates a copy disclaimer display 542. The advanced options interface 534 links to additional functional interfaces for less used functions. These additional functional interfaces include: a change registry interface 550, a liquidate loan interface 552, and an un-liquidate loan interface 554.

Figure 6:
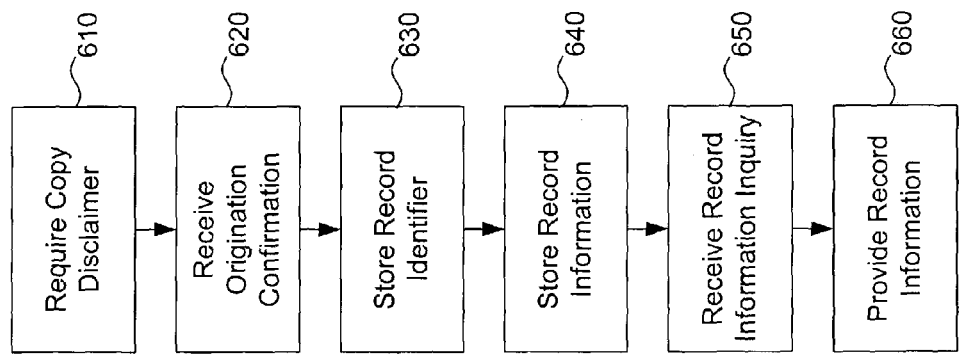
FIG. 6 is an example method of operation for an electronic registry system.

FIG. 6 is an example method of operation 600 for an electronic registry system. A copy disclaimer is required 610 to be displayed in conjunction with copies of a transferable electronic record and associated controller and/or custodian information. Requirement of a copy disclaimer may be enforced by contract, technical specification, automated compliance enforcement, or other methods. In one embodiment, all loan originators must include the copy disclaimer within each transferable electronic record both under contract with the registry provider and in order to comply with the technical specifications for the transferable electronic record format.

Origination confirmation is received 620 from the entity or system originating the transferable electronic record through an origination transaction, such as an electronic mortgage closing. One type of origination confirmation is an originating entity authenticating to the electronic registry system and uploading data and documents describing the transferable electronic record. Authentication of the information received and its source is an explicit part of the origination confirmation.

A unique record identifier is stored 630 in the electronic registry system. The electronic registry system may generate or extract a key identifier for storing and accessing information regarding the transferable electronic record.

One or more types of record information are stored 640 in a format that associates it with the unique record identifier. The record information includes information describing the transferable electronic record, its terms and conditions, authentication information, and information linking the record identifier to the present controller and/or custodian of the transferable electronic record. The record information may also include administrative information, status information, transaction history information, and links to documents related to the transferable electronic record.

A record information inquiry is received 650. The electronic registry system acts as a resource for inquiries regarding the transferable electronic records that have been registered with it. Users perform queries against that registry information directly or through a registry supported function. The type of information available and the functions in which the information information operates or is displayed may be limited by the nature of the entity making the inquiry.

Select record information is provided 660 to the user. Record information responsive to the user's inquiry may be displayed directly or may be integrated with a responsive function. Inquiries from users may be received 650 and select record information provided 660 iteratively as part of more complex functions or extended sessions accessing the information stored in the electronic registry system.

FIGS. 7-10 are example methods of providing services through an electronic registry system. These example services provide more detailed examples of components of storing, querying, and providing information to the user.

Figures 7, 8, 9, 10:
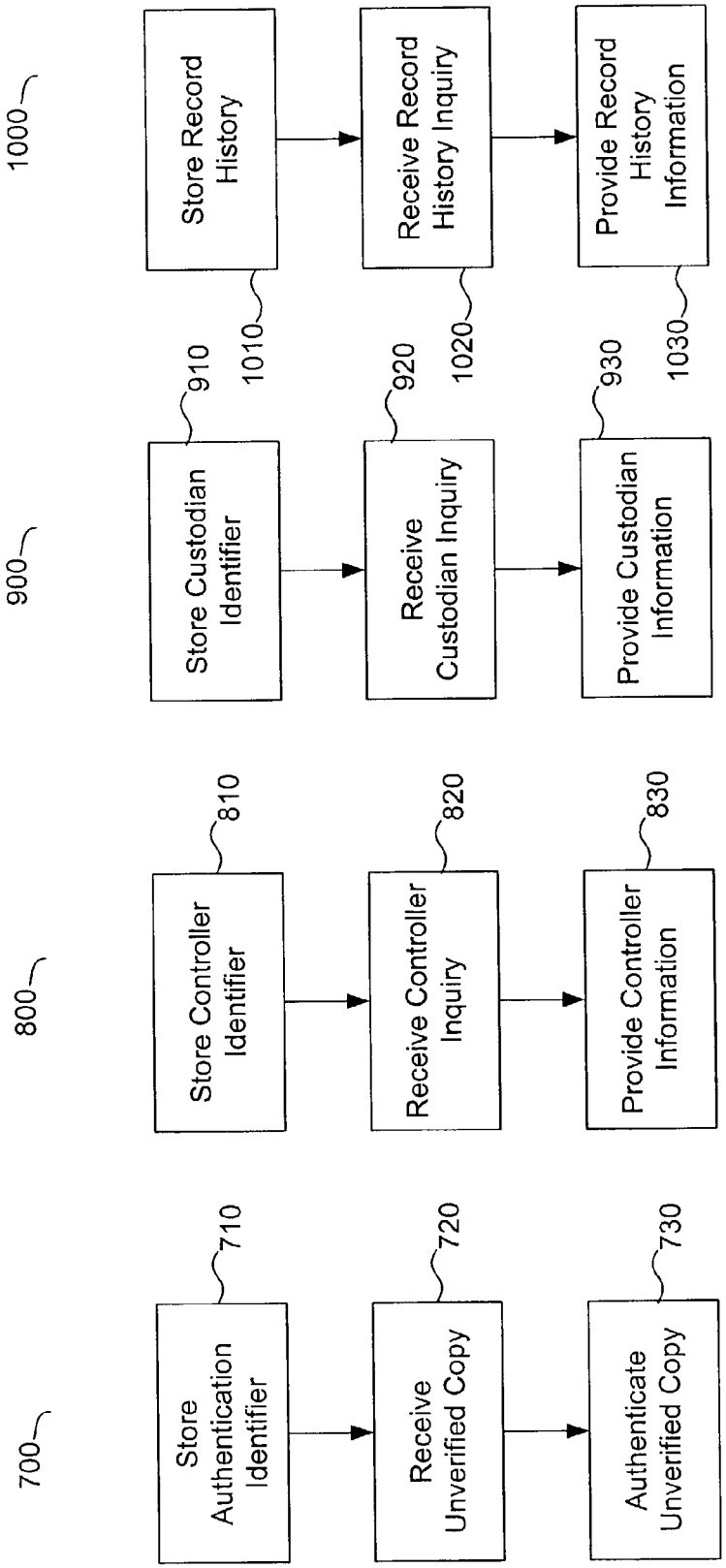
FIGS. 7-10 are example methods of providing services through an electronic registry system.

FIG. 7 shows a method 700 of authenticating an unverified copy of a transferable electronic record. Authentication identifier information is stored 710 by the electronic registry system. For example, the authentication identifier information may include a digital signature associated with the transferable electronic record. An unverified copy of the transferable electronic record is received 720. For example, a user may upload an unverified copy using an interface provided by the electronic registry system. The unverified copy is authenticated 730 using the stored authentication identifier information.

FIG. 8 shows a method 800 of providing controller information for a transferable electronic record. A controller identifier is stored 810 in association with an entry in the electronic registry system for a selected transferable electronic record. For example, a user who registers or receives a transfer of a transferable electronic record has a controller identifier known to the system that can be stored in a table relating the controller identifier to the selected transferable electronic record. An inquiry regarding the controller of the selected transferable electronic record is received 820. The controller identifier is provided 830 to the user. The controller identifier includes an entity name and/or contact information for the entity, which is displayed to the user.

FIG. 9 shows a method 900 of providing custodian information for a transferable electronic record. The method 900 is similar to the method 800, except that a custodian identifier rather than a controller identifier is stored and retrieved.

FIG. 10 shows a method 1000 of providing transaction history information for a transferable electronic record. A record history is stored 1010. The record history will be stored piecemeal as each transaction relating to the transferable electronic record occurs. The record history will include an entry for each transaction that has occurred, starting with origination or registration and extending to the most recent transaction. A request for the record history is received 1020. The record history information, or some subset of it, is provided 1030 to the user.

Figure 11:
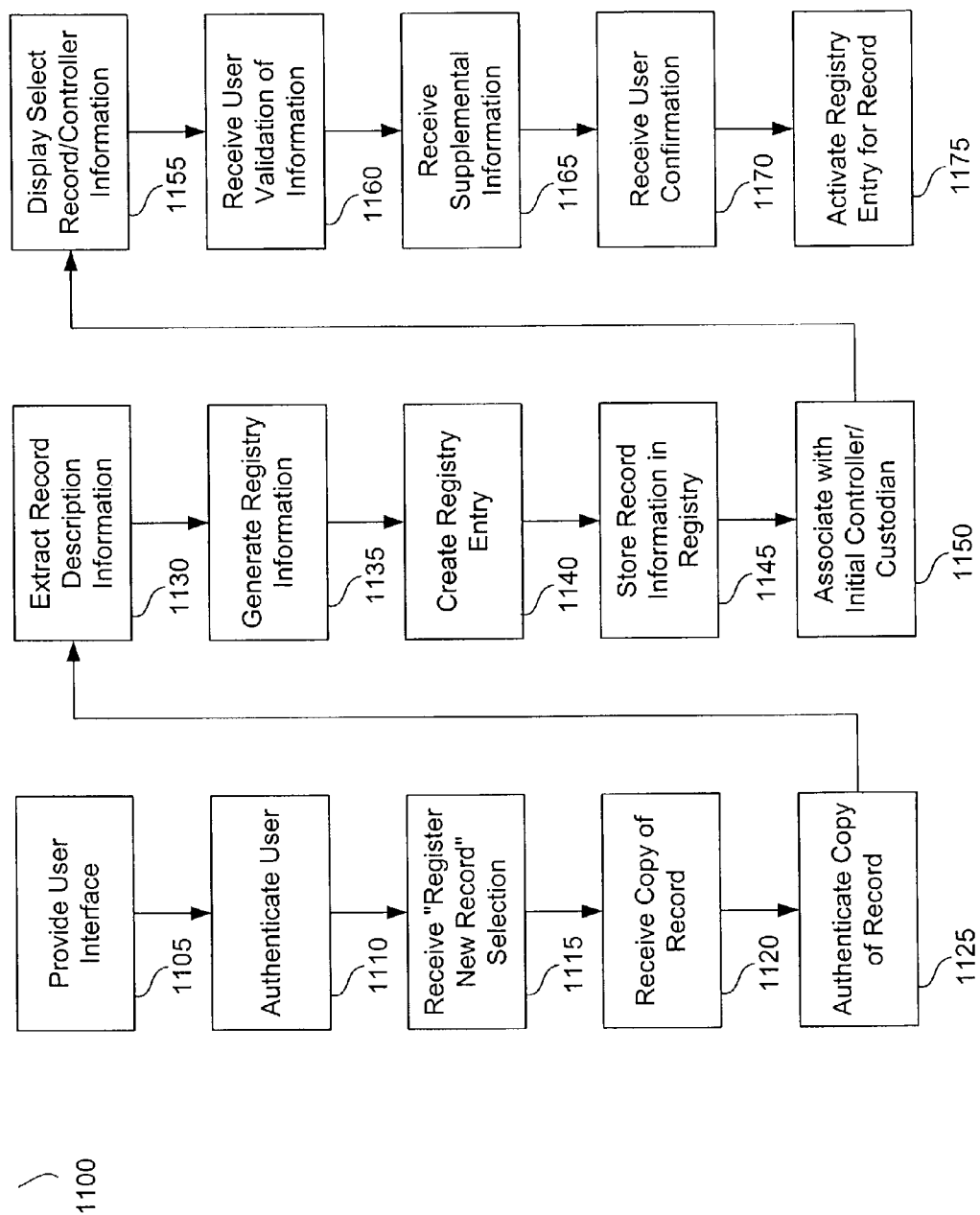
FIG. 11 is an example method of providing registration of a transferable electronic record through an electronic registry system.

FIG. 11 is an example method of providing registration of a transferable electronic record through an electronic registry system. A user interface is provided 1105 to the user by the electronic registry system. The user is authenticated 1110 to the system. A register new record selection is received 1115 to initiate the registration function of the electronic registry system. A copy of the transferable electronic record is received 1120 by the electronic registry system. The copy of the transferable electronic record is authenticated 1125 by the electronic registry system. Record description information is extracted 1130 from the copy of the transferable electronic record. Administrative registry information is generated 1135. A registry entry is created 1140 within the electronic registry system based upon the generated administrative registry information. The record information is stored 1145 in the registry entry created. The registry entry is associated 1150 with an initial controller and/or custodian based upon information provided by the user. Selected record and controller information is displayed 1155 to the user. User validation of the displayed information is received 1160. The user is prompted 1165 to enter supplemental information not extracted from the copy of the transferable electronic record or already available within the electronic registry system. User confirmation of the registration transaction and the information contained therein is received 1170. The registry entry for the transferable electronic record is activated 1175 for use by other users of the electronic registry system. While these actions are shown in a particular order in FIG. 11, this order may be altered and/or steps omitted in some embodiments.

Figure 12:
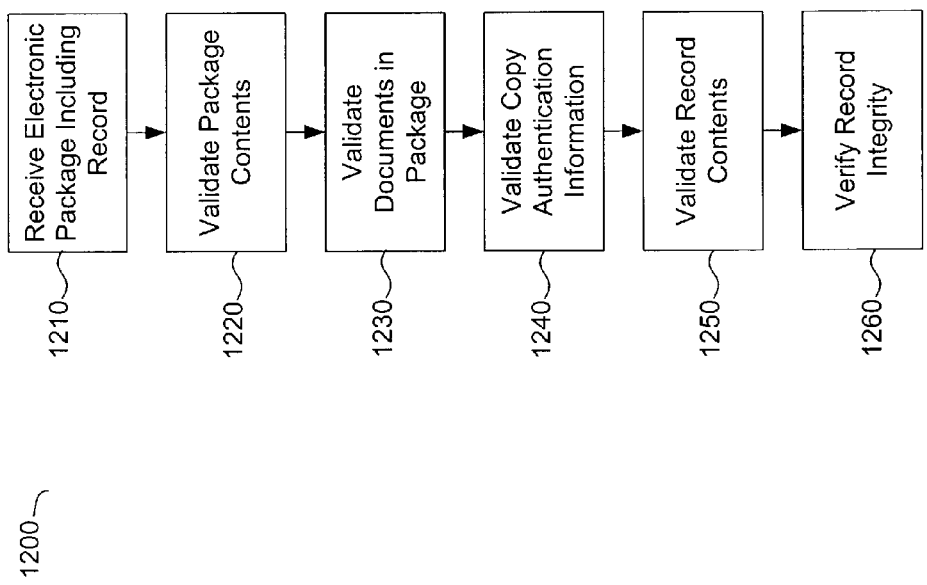
FIG. 12 is an example method of receiving and validating a copy of a record through an electronic registry system.

FIG. 12 is an example method 1200 of receiving and validating a copy of a transferable electronic record through an electronic registry system. An electronic package including a copy of the transferable electronic record is received 1210 by the electronic registry system. The package contents are validated 1220, including validation of the integrity of the package itself. Each document in the package is validated 1230 as to form, including the copy of the transferable electronic record. The copy authentication information associated with the copy of the transferable electronic record is validated 1240. The form of the information contained within the copy of the transferable electronic record is validated 1250. The integrity of the copy of the transferable electronic record is validated 1260 to insure that the document has not been modified. While these actions are shown in a particular order in FIG. 12, this order may be altered and/or steps omitted in some embodiments.

Figure 13:
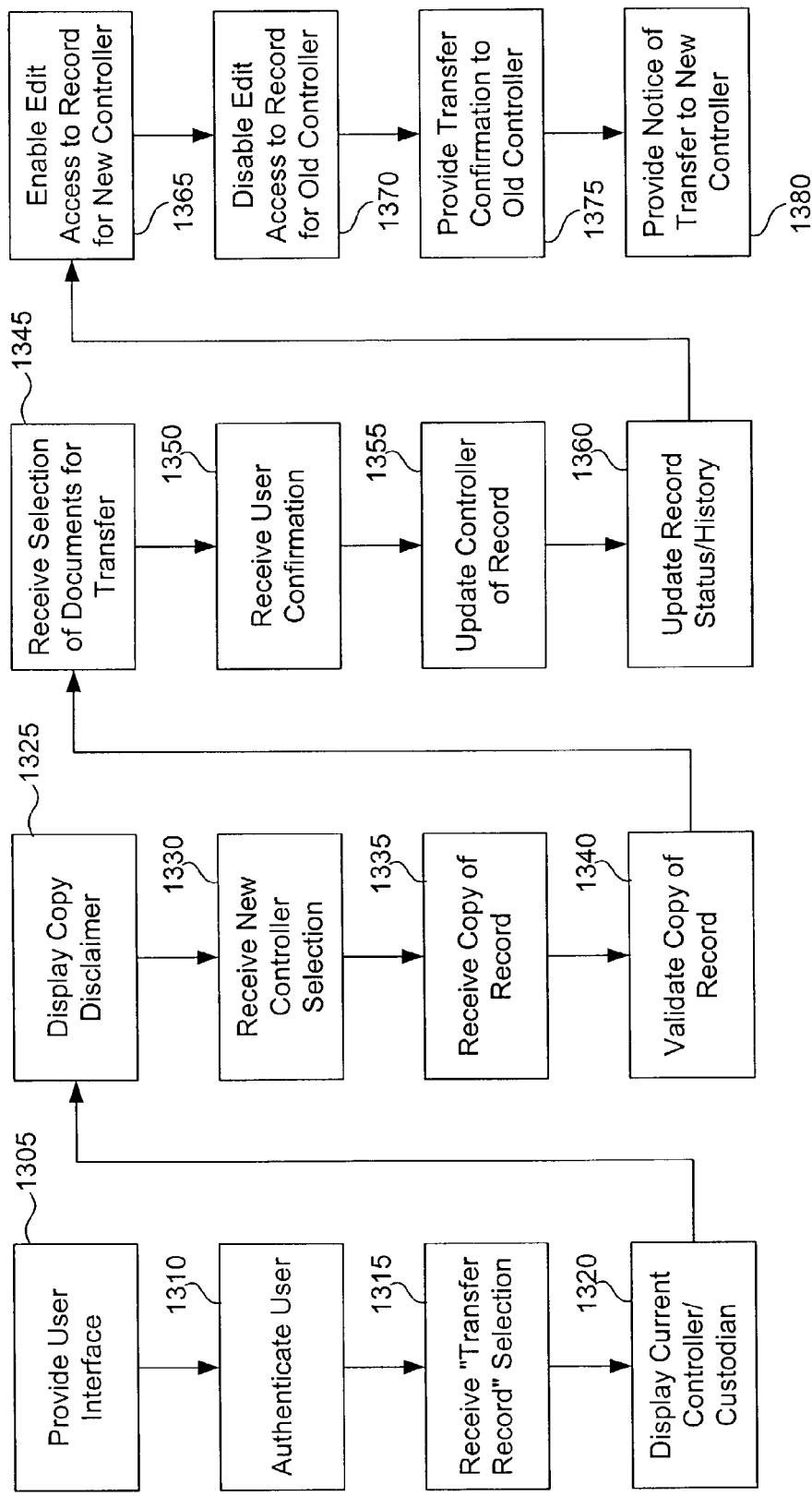
FIG. 13 is an example method of providing transfer of a transferable electronic record through an electronic registry system.

FIG. 13 is an example method 1300 of providing transfer of a transferable electronic record through an electronic registry system. A user interface is provided 1305 by the electronic registry system. A user is authenticated 1310 to the electronic registry system. A transfer record selection is received 1315 by the electronic registry system in order to initiate a transfer function transaction. The current custodian and/or controller is displayed 1320 by the electronic registry system. A copy disclaimer is displayed 1325 by the electronic registry system. Selection of a new controller to whom transfer of control is being made is received 1330. A copy of the transferable electronic record is received 1335 by the electronic registry system. The copy of the transferable electronic record is validated 1340 by the electronic registry system based upon authentication information stored within the electronic registry system. Selection of documents received 1345 along with the copy of the transferable electronic record and/or documents stored by the electronic registry system is received. User confirmation of the transfer transaction is received 1350. The controller associated with the transferable electronic record is updated 1355 to reflect the transfer transaction. The status and transaction history of the transferable electronic record is updated 1360 in the electronic registry system. Edit access for the new controller of the transferable electronic record is enabled 1365. Edit access to the transferable electronic record is disabled 1370 for the old controller. Confirmation of the transfer is provided 1375 to the old controller. Notice of the attempted transfer is provided 1380 to the new controller. While these actions are shown in a particular order in FIG. 13, this order may be altered and/or steps omitted in some embodiments.

The invention claimed is:

1. An electronic registry system, comprising:
    a processor;
    a network communications unit, configured to receive user input and to transmit output information;
    a storage unit;
    a memory including program code stored thereon, the program code being executable by the processor to perform operations comprising:
        receiving, as user input, a true copy of an authoritative copy of a finally executed transferable electronic record;
        storing a unique record identifier for the received true copy;
        extracting information from the received true copy;
        storing the extracted information as record information in the storage unit in association with the unique record identifier;
        receiving queries from a user as user input;
        providing as output information, in response to a query from a user for certain of the record information, the certain of the record information that was queried, wherein provision of the record information as output information does not depend on providing a copy of the true copy of the finally executed transferable electronic record; and
        verifying the authenticity of an unverified copy of the authoritative copy of the finally executed transferable electronic record as a true copy of the authoritative copy of the finally executed transferable electronic record,
    wherein the information extracted from the received true copy that is stored as record information and provided as output information in response to the query from a user comprises the identity of a current controller of the authoritative copy of the finally executed transferable electronic record, and
    wherein each copy of the authoritative copy of the finally executed transferable electronic record includes a copy disclaimer indicating that the authoritative copy of the finally executed transferable electronic record exists and facilitating determination of the current controller of the authoritative copy of the finally executed transferable electronic record.

2. The electronic registry system of claim 1, wherein the information extracted from the received true copy that is stored as record information and provided as output information in response to the query from a user comprises custodian information about a current custodian of the authoritative copy of the finally executed transferable electronic record.

3. The electronic registry system of claim 2, wherein the custodian information extracted from the received true copy that is stored as record information and provided as output information in response to the query from a user includes an address for a file location of the authoritative copy of the finally executed transferable electronic record.

4. The electronic registry system of claim 1, wherein the operations further comprise:
    identifying a sequence of controllers of the authoritative copy of the finally executed transferable electronic record from an originating controller to the current controller; and
    storing the identified sequence as record information, which is provided as output information in response to a query therefor from a user.

5. The electronic registry system of claim 1, wherein an agreement executed by an originating controller provides terms for originating and transferring the finally executed transferable electronic record.

6. The electronic registry system of claim 1, wherein the operations further comprise:
    authenticating a user prior to providing record information as output information to the user within the electronic registry; and
    authenticating a current controller of the authentic copy of the transferable electronic record prior to allowing transfer of custody or control of the authoritative copy of the finally executed transferable electronic record.

7. The electronic registry system of claim 2, wherein the information extracted from the received true copy that is stored as record information and provided as output information in response to the query from a user comprises:
    record description information that describes the finally executed transferable electronic record and the transaction underlying the finally executed transferable electronic record;
    authentication information;
    administrative information; and
    status information.

8. The electronic registry system of claim 7, wherein the information extracted from the received true copy that is stored as record information and provided as output information in response to the query from a user comprises links to documents related to the finally executed transferable electronic record.

9. The electronic registry system of claim 7, wherein the information extracted from the received true copy that is stored as record information and provided as output information in response to the query from a user comprises identification information and loan terms information.

10. The electronic registry system of claim 9, wherein the identification information extracted from the received true copy that is stored as record information and provided as output information in response to the query from a user comprises:
    a lender loan number;
    a MERS MIN number
    a property address; and
    a borrower name.

11. The electronic registry system of claim 9, wherein the loan terms information extracted from the received true copy that is stored as record information and provided as output information in response to the query from a user comprises:
    a loan duration;
    an original loan amount;

an original loan rate;

a first payment due date;

an amortization type; and a loan type.

12. The electronic registry system of claim 7, wherein the administrative information extracted from the received true copy that is stored as record information and provided as output information in response to the query from a user comprises:

a registration identification number; and a date registered.

13. The electronic registry system of claim 1, wherein the operations further comprise enabling the electronic registry system to receive the true copy or the queries for certain record information from different types of users, wherein the types of users include:

a controller of the authentic copy;

a custodian of the authentic copy;

a lender;

an investor; and a certifying authority.

14. The electronic registry system of claim 11, wherein the operations further comprise providing a user interface that includes:

a lender interface;

an investor interface;

a certifying authority interface; and a custodian interface.

15. The electronic registry system of claim 14, wherein the lender interface provides options, selectable by a user that is a lender, that include:

registering a loan;

transferring control of a finally executed transferable electronic record;

authenticating a copy of a finally executed transferable electronic record;

searching registered loans;

viewing record information; and liquidating a loan.

16. The electronic registry system of claim 1, wherein the operations further comprise:

verifying, in response to a user query regarding authenticity of an unverified copy of the authoritative copy of the finally executed transferable electronic record, the authenticity of the unverified copy as a true copy of the authoritative copy of the finally executed transferable electronic record; and providing verification information resulting from verifying the authenticity of the unverified copy as output information to the user.

17. The electronic registry system of claim 1, wherein the operations further comprise:

prompting a user for information about the finally executed transferable electronic record; and receiving as user input information about the finally executed transferable electronic record and storing the received information as record information.

* * * * *